(12) United States Patent
Rohrschneider

(10) Patent No.: US 8,744,126 B1
(45) Date of Patent: Jun. 3, 2014

(54) MORPHOLOGY BASED HAZARD DETECTION

(75) Inventor: Reuben R. Rohrschneider, Boulder, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 157 days.

(21) Appl. No.: 13/414,297

(22) Filed: Mar. 7, 2012

(51) Int. Cl.
*G06K 9/00* (2006.01)

(52) U.S. Cl.
USPC ............ 382/103; 382/100; 382/307; 382/308

(58) Field of Classification Search
USPC ........ 382/100, 103, 307, 308; 606/88, 87, 84; 706/15, 16; 623/17.16; 348/169
See application file for complete search history.

(56) References Cited

U.S. PATENT DOCUMENTS

| | | |
|---|---|---|
| 4,022,532 A | 5/1977 | Montagnino |
| 4,201,468 A | 5/1980 | Margolis et al. |
| 4,730,320 A | 3/1988 | Hidaka et al. |
| 5,029,023 A | 7/1991 | Bearden et al. |
| 5,091,778 A | 2/1992 | Keeler |
| 5,192,978 A | 3/1993 | Keeler |
| 5,317,376 A | 5/1994 | Amzajerdi et al. |
| 5,345,304 A | 9/1994 | Allen |
| 5,357,371 A | 10/1994 | Minott |
| 5,485,009 A | 1/1996 | Meyzonnetie et al. |
| 5,682,225 A | 10/1997 | DuBois et al. |
| 5,682,229 A | 10/1997 | Wangler |
| 5,784,023 A | 7/1998 | Bluege |
| 5,793,034 A | 8/1998 | Wesolowicz et al. |
| 5,815,250 A | 9/1998 | Thomson et al. |
| 5,847,816 A | 12/1998 | Zediker et al. |
| 5,870,180 A | 2/1999 | Wangler |
| 5,870,181 A | 2/1999 | Andressen |
| 5,914,776 A | 6/1999 | Streicher |
| 5,917,596 A | 6/1999 | Jenkins et al. |
| 5,923,466 A | 7/1999 | Krause et al. |
| 6,034,770 A | 3/2000 | Kim et al. |
| 6,173,066 B1 | 1/2001 | Peurach et al. |
| 6,323,941 B1 | 11/2001 | Evans et al. |
| 6,411,871 B1 | 6/2002 | Lin |

(Continued)

FOREIGN PATENT DOCUMENTS

| | | |
|---|---|---|
| GB | 2300325 | 10/1996 |
| GB | 2306828 | 5/1997 |

(Continued)

OTHER PUBLICATIONS

"Mathematical morphology," Wikipedia, last updated Jan. 6, 2012, 8 pages.

(Continued)

*Primary Examiner* — Ali Bayat
(74) *Attorney, Agent, or Firm* — Sheridan Ross P.C.

(57) ABSTRACT

Embodiments of the disclosed invention relate to identifying safe landing sites on a surface. More particularly, three-dimensional image data is obtained from a surface. That image data is processed using morphological operations to create a smoothed surface. The smoothed surface data is then used to calculate slopes, to identify areas of the surface that present a slope hazard. The smooth data obtained for identifying slope hazards can also be used in connection with identifying surface features, including bumps or holes, that create surface feature hazards. After identifying the slope and/or surface feature hazards, a hazard map indicating safe and not safe landing areas can be created.

16 Claims, 6 Drawing Sheets

(56) References Cited

U.S. PATENT DOCUMENTS

| | | |
|---|---|---|
| 6,414,746 B1 | 7/2002 | Stettner et al. |
| 6,434,211 B1 | 8/2002 | Lloyd et al. |
| 6,448,572 B1 | 9/2002 | Tennant et al. |
| 6,542,831 B1 | 4/2003 | Moosmuller et al. |
| 6,608,669 B2 | 8/2003 | Holton et al. |
| 6,646,725 B1 | 11/2003 | Eichinger et al. |
| 6,657,733 B1 | 12/2003 | Drake |
| 6,664,529 B2 | 12/2003 | Pack et al. |
| 6,665,063 B2 | 12/2003 | Jamieson et al. |
| 6,747,258 B2 | 6/2004 | Benz et al. |
| 6,804,607 B1 | 10/2004 | Wood |
| 6,943,868 B2 | 9/2005 | Haig |
| 6,972,887 B2 | 12/2005 | Wickham et al. |
| 7,006,203 B1 | 2/2006 | Book et al. |
| 7,095,488 B2 | 8/2006 | Jamieson et al. |
| 7,113,886 B2 | 9/2006 | West |
| 7,142,981 B2 | 11/2006 | Hablani |
| 7,224,466 B2 | 5/2007 | Ray |
| 7,224,707 B2 | 5/2007 | Gendron |
| 7,236,235 B2 | 6/2007 | Dimsdale |
| 7,240,879 B1 | 7/2007 | Cepollina et al. |
| 7,277,641 B1 | 10/2007 | Gleckman |
| 7,342,228 B1 | 3/2008 | O'Connell et al. |
| 7,345,743 B1 | 3/2008 | Hartman et al. |
| 7,359,057 B2 | 4/2008 | Schwiesow |
| 7,397,568 B2 | 7/2008 | Bryce et al. |
| 7,406,220 B1 | 7/2008 | Christensen et al. |
| 7,436,494 B1 | 10/2008 | Kennedy et al. |
| 7,453,552 B1 | 11/2008 | Miesak et al. |
| 7,580,132 B2 | 8/2009 | Baillon et al. |
| 7,961,301 B2 | 6/2011 | Earhart et al. |
| 8,306,273 B1 | 11/2012 | Gravseth et al. |
| 2002/0117340 A1 | 8/2002 | Stettner |
| 2003/0063884 A1 | 4/2003 | Smith et al. |
| 2004/0021852 A1 | 2/2004 | DeFlumere |
| 2004/0119838 A1 | 6/2004 | Griffis et al. |
| 2004/0130702 A1 | 7/2004 | Jupp et al. |
| 2004/0213463 A1 | 10/2004 | Morrison |
| 2005/0099634 A1 | 5/2005 | Dubois et al. |
| 2006/0088946 A1 | 4/2006 | Willson et al. |
| 2006/0114447 A1 | 6/2006 | Harris et al. |
| 2006/0132752 A1 | 6/2006 | Kane |
| 2006/0136172 A1 | 6/2006 | O'Kane et al. |
| 2006/0197936 A1 | 9/2006 | Liebman et al. |
| 2007/0073486 A1 | 3/2007 | Tillotson et al. |
| 2007/0110364 A1 | 5/2007 | Rice et al. |
| 2007/0115541 A1 | 5/2007 | Rogers et al. |
| 2007/0122001 A1 | 5/2007 | Wang et al. |
| 2007/0171407 A1 | 7/2007 | Cole et al. |
| 2007/0263676 A1 | 11/2007 | Beukema et al. |
| 2008/0023587 A1 | 1/2008 | Head et al. |
| 2008/0136626 A1 | 6/2008 | Hudson et al. |
| 2008/0212328 A1 | 9/2008 | Minano et al. |
| 2008/0273560 A1 | 11/2008 | Stelmakh |
| 2008/0290259 A1 | 11/2008 | Mathewson et al. |
| 2008/0316498 A1 | 12/2008 | Drake et al. |
| 2009/0002680 A1 | 1/2009 | Ruff et al. |
| 2009/0046289 A1 | 2/2009 | Caldwell et al. |
| 2009/0059201 A1 | 3/2009 | Willner et al. |
| 2009/0110267 A1 | 4/2009 | Zakhor et al. |
| 2009/0115994 A1 | 5/2009 | Stettner et al. |
| 2009/0142066 A1 | 6/2009 | Leclair et al. |
| 2009/0237640 A1 | 9/2009 | Krikorian et al. |
| 2009/0273770 A1 | 11/2009 | Bauhahn et al. |
| 2009/0310118 A1 | 12/2009 | Halldorsson |
| 2010/0165323 A1 | 7/2010 | Fiess et al. |
| 2011/0029763 A1* | 2/2011 | Hartmann et al. ............ 706/16 |
| 2012/0038903 A1 | 2/2012 | Weimer et al. |
| 2012/0143197 A1* | 6/2012 | Lang et al. ................. 606/87 |

FOREIGN PATENT DOCUMENTS

| | | |
|---|---|---|
| GB | 2364840 | 2/2002 |
| WO | WO 02/04982 | 1/2002 |
| WO | WO 02/065155 | 8/2002 |
| WO | WO 2007/081628 | 7/2007 |
| WO | WO 2009/133414 | 11/2009 |

OTHER PUBLICATIONS

"OpenCV Wiki," www.opencv.willowgarage.com/wiki/Welcome, accessed on Nov. 1, 2010.

"Linear Algebra Package," www.netlib.org/lapack/, accessed on Nov. 1, 2010.

"Slowsobel macro," www.rsb.info.nih.gov/nih-image/download/user-macros/slowsobel.macro, accessed on Nov. 1, 2010, 4 pages.

Aerius Photonics website, "Aerius NIR/SWIR Illuminators" product sheet, available at www.aeriusphotonics.com/datasheets.html, 2 pages (2009).

Allen et al. "Full-Scale Testing and Platform Stabilization of a Scanning Lidar System for Planetary Landing", Space Exploration Technologies (Wolfgang Fink, ed.), Proceedings of SPIE, vol. 6960, pp. 696004-1-696004-10 (2008).

Allen et al. "Rendezvous Lidar Sensor System for Terminal Rendezvous, Capture, and Berthing to the International Space Station", Sensors and Systems for Space Applications II, SPIE vol. 6958, 8 pages (2008).

Aull et al. "Geiger-Mode Avalanche Photodiodes for Three-Dimensional Imaging", Lincoln Laboratory Journal, vol. 13, No. 2 (2002).

Bakalski et al. "Real Time Processing Enables Fast 3D Imaging at Single Photon Level", Laser Radar Technology and Applications XIII, (Monte D. Turner, Gary W. Kamerman, ed.), Proceedings of the SPIE, vol. 6950, pp. 69500K-1-69500K-9 (2008).

Baker et al. "Advanced Infrared Detectors for Multimode Active and Passive Imaging Applications" Infrared Technologies and Applications XXXIV (Bjorn F. Andresen, Gabor F. Fulop, and Paul R. Norton, ed.), Proceedings of the SPIE, vol. 6940, pp. 69402L-1-69402L-11 (2008).

Brady et al. "ALHAT System Architecture and Operational Concept", Aerospace Conference, 2007 IEEE, Big Sky, MT, IEEEAC Paper # 1570, Version 4, pp. 1-13 (2007).

Bruneau, "Mach-Zehnder Interferometer as a Spectral Analyzer for Molecular Doppler Wind Lidar", Applied Optics, vol. 40, No. 3, pp. 391-399 (2001).

Bruneau and Jacques Pelon, "Simulation and Measurement of Particle Backscattering & Extinction Coefficient & Wind Velocity by Lidar with a Mach-Zehnder Interferometer: Principle of Operation & Performance Assessment", Applied Optics, vol. 42, No. 6, pp. 1101-1114 (2003).

Chen et al. "RANSAC-Based DARCES: A New Approach to Fast Automatic Registration of Partially Overlapping Range Images", IEEE Transactions on Pattern Analysis and Machine Intelligence, vol. 21, No. 11, 6 pages (Nov. 1999).

Cho et al. "Real-Time 3D Ladar Imaging", 35th Applied Imagery and Patern Recognition Workshop, pp. 5 (2006).

Cohanim et al. "Approach Phase D V Considerations for Lunar Landing," Aerospace Conference, 2009 IEEE, Mar. 7-14, 2009, pp. 1-11 (ISBN: 978-1-4244-2621-8).

Connes et al. "Astronomical Fourier Spectrometer", Applied Optics, vol. 14, No. 9, pp. 2067-2084 (1975).

Craig et al. "Processing 3D Flash LADAR Point-Clouds in Real-Time for Flight Applications", Sensors and Systems for Space Applications (Richard T. Howard and Robert D. Richards, ed.), Proceedings of SPIE, vol. 6555, pp. 65550D-1-65550D-9 (2007).

Degnan, "Photon-Counting Multikilohertz Microlaser Altimeters for Airborne and Spaceborne Topographic Measurements", Journal of Geodynamics, vol. 34, pp. 503-549 (2002).

De Lafontaine et al. "LAPS: The Development of a Scanning Lidar System with GNC for Autonomous Hazard Avoidance and Precision Landing"; Spaceborne Sensors (Robert D. Habbit, Jr. and Peter Tchoryk, Jr., ed.), Proceedings of SPIE, vol. 5418, pp. 81-93 (2004).

Dissly et al. "Flash LIDAR Systems for Planetary Exploration", American Astronomical Society, DPS Meeting, Presentation # 40, Ithaca, NY, Bulletin of the American Astronoimical Society, vol. 41, pp. 560 (2008).

(56) References Cited

OTHER PUBLICATIONS

Durrani et al. "Spectral Analysis and Cross-Correlation Techniques for Photon Counting Measurements on Fluid Flows", Applied Optics, vol. 14, No. 3, pp. 778-794 (1975).
Elmqvist "Ground Surface Estimation from Airborne Laser Scanner Data Using Active Shape Models," Proceedings of the ISPRS, vol. XXXIV, Part3A/B, Sep. 9-13, 2002, pp. A-114-A-118.
Fay et al. "Fusion of Multi-Sensor Pasive and Active 3D Imagery", Enhanced and Synthetic Vision 2001 (Jacques G. Verly, ed.), Proceedings of SPIE, vol. 4363, pp. 219-230 (2001).
Fenton, "A LADAR-Based Pose Estimation Algorithm for Determining Relative Motion of a Spacecraft for Autonomous Rendezvous and Dock", Master of Science thesis, Utah State University, 90 pages (2008).
Fenton et al. "Simulation Tests of a Lidar-based Spacecraft Pose Determination Algorithm", Sensors and Systems for Space Applications, SPIE vol. 6555, 11 pages (2007).
Gault, et al. "ERWIN: An E-Region Wind Interferometer", Applied Optics, vol. 35, No. 16, pp. 2913-2922 (1996).
Gentry et al. "The Tropospheric Wind Lidar Technology Experiment (TWiLiTE): An Airborne Direct Detection Doppler Lidar Instrument Development Program", available at www.esto.nasa.gov/conferences/estc2006/papers/b8p2.pdf.
Gillula, "Data Fusion From Multiple Sensors: Real-Time Mapping on an Unmanned Ground Vehicle", 2005 SURF Final Report, California Institute of Technology, 13 pgs (2005).
Grund et al. "Enabling Characteristics of Optical Autocovariance Lidar for Global Wind and Aerosol Profiling", AGU, American Geophysical Union, Fall Meeting, San Francisco, CA (Dec. 16, 2008).
Grund, "An Alternative Direct Detection Approach to Doppler Winds that is Independent of Aerosol Mixing Ratio and Transmitter Frequency Jitter", Space Winds Lidar Working Group, Miami, FL (Feb. 8, 2007).
Grund et al. "Optical Autocovariance Wind Lidar and Performance from LEO", 14th Coherent Laser Radar Conference, Snowmass, CO (Jul. 7, 2007).
Grund et al. "Supporting NOAA and NASA High-Performance Space-Based DWL Measurement Objectives with a Minimum Cost, Mass, Power, and Risk Approach Employing Optical Autocovariance Wind Lidar (OAWL)", Space Winds Lidar Working Group, Monterrey, CA (Feb. 6, 2008).
Grund et al. Presentation Entitled "Simultaneous Profiling of Aerosol Optical Properties, Gas Chemistry, and Winds with Optical Autocovariance Lidar", 24th ILRC Conference (Jun. 23, 2008).
Grund, "Lidar Wind Profiling from Geostationary Orbit Using Imaging Optical Autocovariance Interferometry", Space Winds Lidar Working Group, Snowmass, CO (Jul. 17, 2007).
Grund et al. "Optical Autocovariance Wind Lidar (OAWL) for Efficient Space-Based Direct-Detection High-Resolution Aerosol Backscatter Winds", International Laser Radar Conference, Boulder, CO (Jun. 24, 2008), 1 page.
Grund et al. Poster Entitled "Optical Autocovariance Wind Lidar (OAWL) for Efficient Space-Based Direct-Detection High-Resolution Aerosol Backscatter Winds", presented at the Coherent Laser Radar Conference, Jul. 2007, presented at the Working Group on Space-based Lidar Winds, Feb. 2008, and presented at the International Laser Radar Conference, Boulder, CO, Jun. 23-27, 2008, 1 page.
Grund, Christian J., Power Point Presentation Entitled "Optical Autocovariance: Alternative Direct Detection Approach to Doppler Winds that is Independent of Aerosol Mixing Ratio and Transmitter Frequency Jitter", presented at the Working Group Conference on Space-Based Lidar Winds, Feb. 6-9, 2007, 12 pages.
Grund et al. Presentation Entitled "Optical Autocovariance Wind Lidar and Performance from LEO", presented at the Coherent Laser Radar Conference, Jul. 11, 2007, 30 pages.
Grund et al. "Simultaneous Profiling of Aerosol Optical Properties, Gas Chemistry, and Winds with Optical Autocovariance Lidar", Paper 1 of 2 presented at the 24th International Laser Radar Conference, Jun. 23-27, 2008, 5 pages.
Grund et al. "Optical Autocovariance Wind Lidar (OAWL) for Efficient Space-Based Direct-Detection High-Resolution Aerosol Backscatter Winds", Paper 2 of 2 presented at the 24th International Laser Radar Conference, Jun. 23-27, 2008, 5 pages.
Habbit et al. "Utilization of Flash LADAR for Cooperative and Uncooperative Rendezvous and Capture", Space Systems Technology and Operations (Peter Tchoryk, Jr. and James Shoemaker, ed.), Proceedings of SPIE, vol. 5088, pp. 146-157 (2003).
Huertas et al. "Passive Imaging Based Multi-Cue Hazard Detection for Spacecraft Safe Landing," Aerospace Conference, 2006 IEEE, Mar. 4-11, 2006, paper #1434 (ISBN: 0-7803-9545-X).
Hyde et al. "Mapping Forest Structure for Wildlife Habitat Analysis Using Multi-Sensor (LiDAR, SAR/InSAR, ETM+, Quickbird) Synergy", Remote Sensing of Environment, vol. 102, pp. 63-73 (2006).
Jacquinot, "The Luminosity of Spectrometers with Prisms, Gratings, or Fabry-Perot Etalons", Journal of the Optical Society of America, vol. 44, No. 10, pp. 761-765 (1954).
Jasiobedzki et al. "Autonomous Satellite Rendezvous and Docking Using LIDAR and Model Based Vision", Spaceborne Sensors II, SPIE vol. 5798, 12 pages (2005).
Johnson et al. "Analysis of On-Board Hazard Detection and Avoidance for Safe Lunar Landing," Aerospace Conference, 2008 IEEE, paper #1656, Mar. 1-8, 2008, pp. 1-9 (ISBN: 978-1-4244-1487-1).
Johnson et al. "Lidar-Based Hazard Avoidance for Safe Landing on Mars," Journal of Guidance, Control, and Dynamics, Nov.-Dec. 2002, vol. 25, No. 6, pp. 1091-1099.
Johnson et al. "Analysis of Flash Lidar Field Test Data for Safe Lunar Landing," Aerospace Conference, 2010 IEEE, paper #1659, Mar. 7-14, 2009.
Kasten, et al. "Fabrication and Characterization of Individually Addressable Vertical-Cavity Surface-Emitting Laser Arrays and Integrated VCSEL/PIN Detector Arrays", Proceedings of SPIE, vol. 6484, 64840C, 2007.
Kumar et al. "Determination of the Instrument Function of a Grating Spectrometer by Using White-Light Interferometry", Applied Optics, vol. 36, No. 19, pp. 4535-4539 (1997).
Lamoreux et al. "Relative Navigation Sensor for Autonomous Rendezvous and Docking", Laser Radar Technology and Applications VIII (Gary W. Kamerman, ed.), Proceedings of the SPIE, vol. 5086, pp. 317-328 (2003).
Lefsky et al. "Estimates of Forest Canopy Height and Aboveground Biomass Using ICESat", Geophysical Research Letters, vol. 32, L2202, 4 pages (2005).
Liebe et al. "Spacecraft Hazard Avoidance Utilizing Structured Light," Aerospace Conference, 2006 IEEE, Mar. 4-11, 2006, paper #1071 (ISBN: 0-7803-9545-X).
Lieber et al. "Development of a Validated End-to-End Model for Space-Based Lidar Systems", Lidar Remote Sensing for Environmental Monitoring VIII (Singh, Upendra N. ed.), Proceedings of the SPIE, vol. 6681, 66810F (2007).
Lieber et al. "Integrated System Modeling for Evaluating the Coronagraph Approach to Plant Detection", High-Contrast Imaging for Exo-Planet Detection (Schultz, Alfred B. ed.), Proceedings of the SPIE, vol. 4860 (2002). (Abstract only).
Lieber et al. "System Verification of the JMEX Mission Residual Motion Requirements with Integrated Modeling", UV/Optical/IR Space Telescopes: Innovative Technologies and Concepts II (MacEwen, Howard A. ed.), Proceedings of the SPIE, vol. 5899, 589901, pp. 1-12 (2005).
Marino et al. "Jigsaw: A Foliage-Penetrating 3D Imaging Laser Radar System"; Lincoln Laboratory Journal, vol. 15, No. 1, pp. 23-36 (2005).
Mayo, Jr., "Photon Counting Processor for Laser Velocimetry", Applied Optics, vol. 16, No. 5, pp. 1157-1162 (1977).
Missioin Evaluation Team "Apollo 15 Mission Report," NASA, Dec. 1971, NASA-TM-X-68394, 341 pages.
Morton "Photon Counting", Applied Optics, vol. 7, No. 1, pp. 1-10 (1968).

(56) References Cited

OTHER PUBLICATIONS

Nicks et al. "Flash Ladar Flight Testing and Pathway to UAV Deployment," 2010 AIAA Infotech Conference, Atlanta, GA, Apr. 20-22, 2010.

Oberle et al. "Toward High Resolution, Ladar-Quality 3-D World Models Using Ladar-Stereo Data Integration and Fusion," Army Research Laboratory, ARL-TR-3407, 37 pgs (2005).

Pack et al. "A Co-Boresighted Synchronized Ladar/EO Imager for Creating 3D Images of Dynamic Scences", Laser Radar Technology and Applications, X (Gary W. Kamerman, ed.), Proceedings of SPIE, vol. 5791, pp. 42-50 (2005).

Pierrottet et al. "Characterization of 3-D Imaging Lidar for Hazard Avoidance and Autonomous Landing on the Moon"; Laser Radar Technology and Applications XII (Monte D. Turner and Gary W. Kamerman, ed.), Proceedings of SPIE, vol. 6550, pp. 655008-1-655008-9 (2007).

Rabinovich et al. "45 Mbps Cat's Eye Modulating Retro-Reflector Link Over 7 Km", Free-Space Laser Communications VI, Proceedings of the SPIE, vol. 6304, pp. 63040Q (2006). (Abstract only).

Reiley et al. "Three-dimensional laser radar simulation for autonomous spacecraft landing," SPIE Proceedings, Aug. 1991, vol. 1416, pp. 295-303.

Richardson et al. "Design and Performance Considerations of Cat's Eye Retroreflectors for Use in Open-Path Fourier-Transform-Infrared Spectrometry", Applied Optics, vol. 41, No. 30, pp. 6332-6340 (2002).

Ring et al. "Field-Compensated Michelson Spectrometers", Applied Optics, vol. 11, No. 3, pp. 507-516 (1972).

Riris et al. "The Lunar Orbiter Laser Altimeter (LOLA) on NASA's Lunar Reconnaissance Orbirot (LRO) Mission", Sensors and Systems for Space Applications (Richard T. Howard and Robert D. Richards, ed.), Proceedings of SPIE, vol. 6555, pp. 655501-1-655501-8 (2007).

Roberts, Jr. et al. "Aperture Sharing Between Low-Background Infrared Sensors and Ladar Sensors", Aerospace Applications Conference, Proceedings of the IEEE, vol. 4, pp. 495-508 (1996).

Ruel et al. "Field Testing of a 3D Automatic Target Recognition and Pose Estimation Algorithm", Automatic Target Recognition XIV, SPIE vol. 5426, 10 pages (2004).

Ruel et al. "Real-Time 3D Vision Solution for On-Orbit Autonomous Rendezvous & Docking", Spaceborne Sensors III, SPIE 6220, 11 pages (2006).

Shepherd et al. "WANDII: Wide-Angle Michelson Doppler Imaging Interferometer for Spacelab", Applied Optics, vol. 24, No. 11, pp. 1571-1584 (1985).

Shepherd et al. "WINDII—The Wind Imaging Interferometer for the Upper Atmosphere Research Satellite", Geophys. Res. vol. 98, No. D6, pp. 10,725-10,750 (1993).

Smith et al. "Diffractive Optics for Moon Topography Mapping"; Micro (MEMS) and Nanotechnologies for Space Applications (Thomas, George and Zhong-Yang Cheng, ed.), Proceedings of SPIE, vol. 6223, pp. 622304-1-622304-10 (2006).

Stentz et al. "Real-Time, Multi-Perspective Perception for Unmanned Ground Vehicles", Proceedings of the Association for Unmanned Vehicle Systems International, 15 pgs (2003).

Stettner et al. "Three Dimensional Flash Ladar Focal Planes and Time Dependent Imaging," International Symposium on spectral Sensing Research, May 31, 2006, retrieved at www.advancedscientificconcepts.com/technology/documents/ThreeDimensionalFlashLabdarFoc alPlanes-ISSSRPaper.pdf, 5 pages.

Tan et al. "Design and Performance of a Multiwavelength Airborne Polarimetric Lidar for Vegetation Remote Sensing"; Journal of Applied Optics, vol. 43, No. 11, pp. 2360-2368 (2004).

Trenkle et al. "3D Sensor Algorithms for Spacecraft Pose Determination", Spaceborne Sensors III (Richard T Howard and Robert D. Richards, ed.), Proceedings of SPIE, vol. 6220, pp. 62200D-1-62200D-14 (2006).

Vallerga et al. "Noiseless, High Frame Rate (>KHz), Photon Counting Arrays for Use in the Optical to the Extreme UV", University of California, Berkeley—Sciences Laboratory and University of Geneva, Switzerland, available at www.ssl.berkeley.edu/~mcphate/AO/ao_medipix.html (2004-present).

Vasile et al. "Pose-Independent Automatic Target Detection and Recognition Using 3D Laser Radar Imagery", Lincoln Laboratory Journal, vol. 15, No. 1, 18 pages (2005).

Wang et al. "Optimized Reflective Wide-Angle Michelson Phase-Stepping Interferometer", Applied Optics, vol. 39, No. 28, pp. 5147-5160, (2000).

Weinberg et al. "Flash Lidar Systems for Hazard Detection, Surface Navigation and Autonomous Rendezvous and Docking", 2007 LEAG Workshop on Enabling Exploration, 2 pgs (2007).

"RANSAC", Wikipedia available at www.en.wikipedia.org/wiki/RANSAC, 5 pages (2009).

Xun et al. "Expanding range of pulsed range sensors with active projection from spatial light modulators", Spaceborne Sensors III, Proc. of SPIE vol. 6220, 622001, 2006, 9 pages.

Yoon et al. "High Frequency Attitude Motion of ICESat", Advances in Astronautical Sciences (David A. Vollado, Michael J. Gabor and Prasun N. Desai ed.), vol. 120: Spaceflight Mechanics, Part 1, pp. 117-131 (2005).

\* cited by examiner $$H = [\begin{matrix} 5 & 6 & 7 & 8 & 9 & 10 & 9 & 8 & 7 & 6 & 5; \\ 4 & 5 & 6 & 7 & 8 & 9 & 8 & 7 & 6 & 5 & 4; \\ 3 & 4 & 5 & 6 & 7 & 8 & 7 & 6 & 5 & 4 & 3; \\ 2 & 3 & 4 & 5 & 6 & 7 & 6 & 5 & 4 & 3 & 2; \\ 1 & 2 & 3 & 4 & 5 & 6 & 5 & 4 & 3 & 2 & 1; \\ 0 & 0 & 0 & 0 & 0 & 0 & 0 & 0 & 0 & 0 & 0; \\ -1 & -2 & -3 & -4 & -5 & -6 & -5 & -4 & -3 & -2 & -1; \\ -2 & -3 & -4 & -5 & -6 & -7 & -6 & -5 & -4 & -3 & -2; \\ -3 & -4 & -5 & -6 & -7 & -8 & -7 & -6 & -5 & -4 & -3; \\ -4 & -5 & -6 & -7 & -8 & -9 & -8 & -7 & -6 & -5 & -4; \\ -5 & -6 & -7 & -8 & -9 & -10 & -9 & -8 & -7 & -6 & -5]; \end{matrix} \quad \%11 \times 11$$

FIG.5

MORPHOLOGY BASED HAZARD DETECTION

FIELD

Methods and systems for detecting hazardous surfaces using three-dimensional surface data are provided.

BACKGROUND

Landing on planetary bodies has always been a dangerous task for both piloted and robotic vehicles. Despite careful site selection, a single tall rock not adequately resolved in surface imagery, or a small steep slope not captured by topography data, has the ability to end the mission prematurely. Robotic missions are largely at the mercy of chance during landing, since they currently have no ability to sense obstacles and adjust their landing location. This requires that robotic missions land in relatively flat areas, with few large rocks visible in the available imagery. However, such sites are usually not the most scientifically interesting locations. Even with astronauts piloting the lander, lighting conditions can make it difficult to discern slopes and rock heights, which places limitations on the landing time and location. This was demonstrated by the Apollo 15 mission, which landed on the edge of a small crater, damaging the engine bell of the lunar excursion module.

To improve landing safety, the landing site must be sensed remotely, and lander scale hazards and slopes must be detected. To avoid excessive fuel consumption, the hazard and slope detection must operate quickly (e.g., in less than 60 seconds), including both sensing and safe site determination.

Hazard detection methods that use two-dimensional visible images have been developed. These methods rely on shadows or texture to determine surface hazards. Using such methods for rock detection appears to be acceptable, but places limits on the landing time to attain favorable lighting conditions and detectable shadows. However, the use of a single two-dimensional visible image makes local slopes difficult to predict, since they can occur on surfaces without shadows, and since visible texture may not differ from level areas. The use of two images from a stereo camera or two images from the same camera with known separation can be used to determine slope. However, techniques for determining slope from multiple two-dimensional images have been unacceptably slow and/or computationally expensive. As an alternative, a structure from a motion solution can produce a dense set of data of surface altitudes, but is computationally very expensive. The use of homography slope estimation can be fast enough for flight use, but produces a low density data set suitable only for local slope determination.

In any approach that utilizes visible light cameras, the solution is dependent on local lighting conditions. This is an undesirable trait for most missions, and unacceptable for many missions. To make hazard detection solutions independent of local lighting conditions, active sensors must be used. Examples of such active sensors include structured light camera and light detection and ranging (LIDAR) systems. These systems produce range data to a solid surface that can be used to determine local hazards and slopes. However, the techniques that have been developed for hazard detection using such three-dimensional data systems have been relatively slow and computationally expensive.

One example of a technique for identifying hazards from terrain data is the plane fitting method developed at the Jet Propulsion Laboratory (JPL) for Mars landing, and studied further as part of the autonomous landing and hazard avoidance technology (ALHAT) program for moon landing. The method starts with a three-dimensional terrain model and fits planes to regions with dimensions similar to the required landing footprint including navigation error. Rather than fitting a plane to every possible landing center line of the input data grid, the planes are fit in a grid pattern with no overlap. It is not necessary to fit a plane at every grid point because the slope of the underlying surface usually various slowly (although crater rims violate this) and it is computationally expensive to fit a robust plane. The need for near real time hazard detection requires that a plane is not fit at every grid point to run on existing flight processors. The plane fitting method used is least median squares, which determines outliers (such as rocks) and excludes them from the data used for plane fitting. When the rocks are excluded from the plane fit, the underlying surface is found and can be subtracted from the image terrain to find bumps. Slopes are found directly from the slope of the underlying plane, and slopes are interpolated across the grid. Both slopes and bumps are compared to threshold values and the results of this comparison are combined to produce a map of good and bad landing sites. To smooth this map and find the best locations, image dilation or erosion is performed to shrink the good landing regions. This helps eliminate very small regions of safe landing sites and makes it easier to focus on the best and safest landing sites.

SUMMARY

Embodiments of the disclosed invention provide systems and methods for hazard detection using three-dimensional surface data. These systems and methods are suitable for use in landing operations conducted with respect to surfaces for which there is little or no a priori knowledge of surface hazards on a scale relevant to the footprint of the vehicle involved in the landing operation. Embodiments of the disclosed invention receive three-dimensional data related to the surface, and perform an image morphology operation on the three-dimensional data to obtain base surface data. From the base surface data, a slope of the surface relative to a reference is determined. If the determined slope of the surface across an area deemed large enough for a safe landing of the vehicle is less than a threshold amount, that area can be identified as a safe or good landing site. Conversely, if the determined slope within an area large enough for a landing exceeds the threshold amount, that area can be identified as an unsafe landing site.

The image morphology operation performed on the three-dimensional surface data can include a morphological closing and a morphological opening. The image morphology operation can further include smoothing the three-dimensional data using a structuring element having a size corresponding to a footprint of the lander (i.e., the vehicle performing the landing operation). Moreover, the structuring element can comprise a flat disk. The calculation of a slope from the base surface obtained through the image morphology operation can include calculating a number of points over which to take finite differences for slope determination, taking a finite central difference along each direction, and calculating angles from the finite differences in each direction. The points in the base surface data can correspond to data obtained with respect to individual pixels of the device used to capture the three-dimensional data. The number of points over which the finite differences are taken can be equal to the number of points in the base surface data included in a distance across the surface that is equal to the diameter of the lander footprint.

In addition to the image morphology operations, other processing can be performed. For example, the locations of features on the surface can be determined from the base surface data. The identification of features, such as bumps or holes, can include subtracting the three-dimensional data from the base surface data, and identifying points in the surface feature data that exceed a bump threshold. Moreover, a positive value of points in the surface feature data that exceed the bump threshold is an indication of a bump that extends from the surface, while a negative value is an indication of a hole in the surface. As another example, the dimensions of good landing sites can be eroded by applying a proportionality that is equal to some value less than one multiplied by the radius of the lander footprint. As yet another example, each good landing site can be dilated by applying a proportionality value that is equal to some value less than one multiplied by the radius of the lander footprint.

A system for morphology based hazard detection in accordance with embodiments of the disclosed invention can include a sensor system for obtaining three-dimensional data related to a surface. Examples of suitable sensor systems include active systems, such as flash LIDAR or scanning LIDAR systems. Examples of sensor systems also include passive systems, such as stereographic imagers or cameras, spatially separated cameras, or a camera operated so as to obtain images of the surface from different locations relative to the surface. The system can additionally include a processor and memory. The processor can implement the various algorithms used to process the three-dimensional data obtained by the sensor system, and to identify safe and not safe landing sites on the surface. The processor can further provide output, which can be applied by a navigation and control system of the lander, to direct the lander to a safe landing site.

Additional features and advantages of embodiments of the disclosed invention will become more readily apparent from the following description, particularly when taken together with the accompanying drawings.

BRIEF DESCRIPTION OF THE DRAWINGS

FIG. 5 is an example of a differentiation kernel that can be applied in slope detection in accordance with embodiments of the present disclosure;

DETAILED DESCRIPTION

Figure 1:
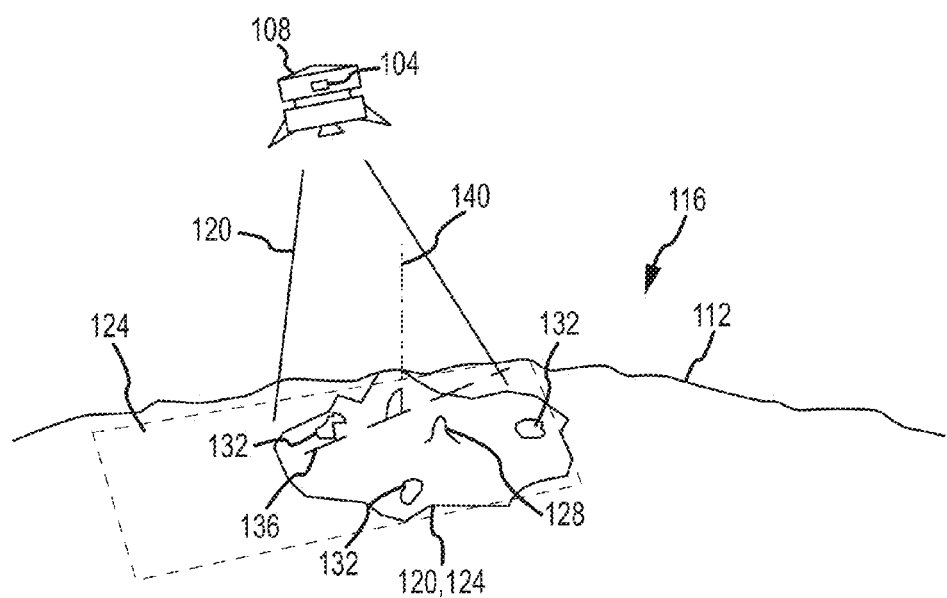
FIG. 1 depicts an example of a landing scenario in accordance with embodiments of the present disclosure.

FIG. 1 depicts a hazard detection system 104 operated in connection with a landing vehicle or lander 108 in an exemplary landing scenario. As shown in the figure, the lander 108, incorporating or carrying the hazard detection system 104, is approaching the surface 112 of a planet or other body 116. The hazard detection system 104 obtains three-dimensional (3D) image data arranged in sets or frames of data obtained from within a field of view 120 of the hazard detection system 104. Individual frames or combined (i.e., stitched) frames of data comprise an imaged area 124 of the surface 112. As discussed in greater detail elsewhere herein, the hazard detection system 104 operates to identify areas of the surface 112 within the imaged area 124 that present hazards and therefore are unsuitable as a landing site for the lander 108. Examples of hazards that can be detected include bumps or other projections 128 in excess of a threshold height, holes or depressions 132 in excess of a threshold depth, and surface slopes 136 that deviate from being normal to a reference line 140 by more than a selected threshold angle. In accordance with embodiments of the present disclosure, the reference line 140 can be coincident with or derived from the gravity vector of the body 116.

Figure 2:
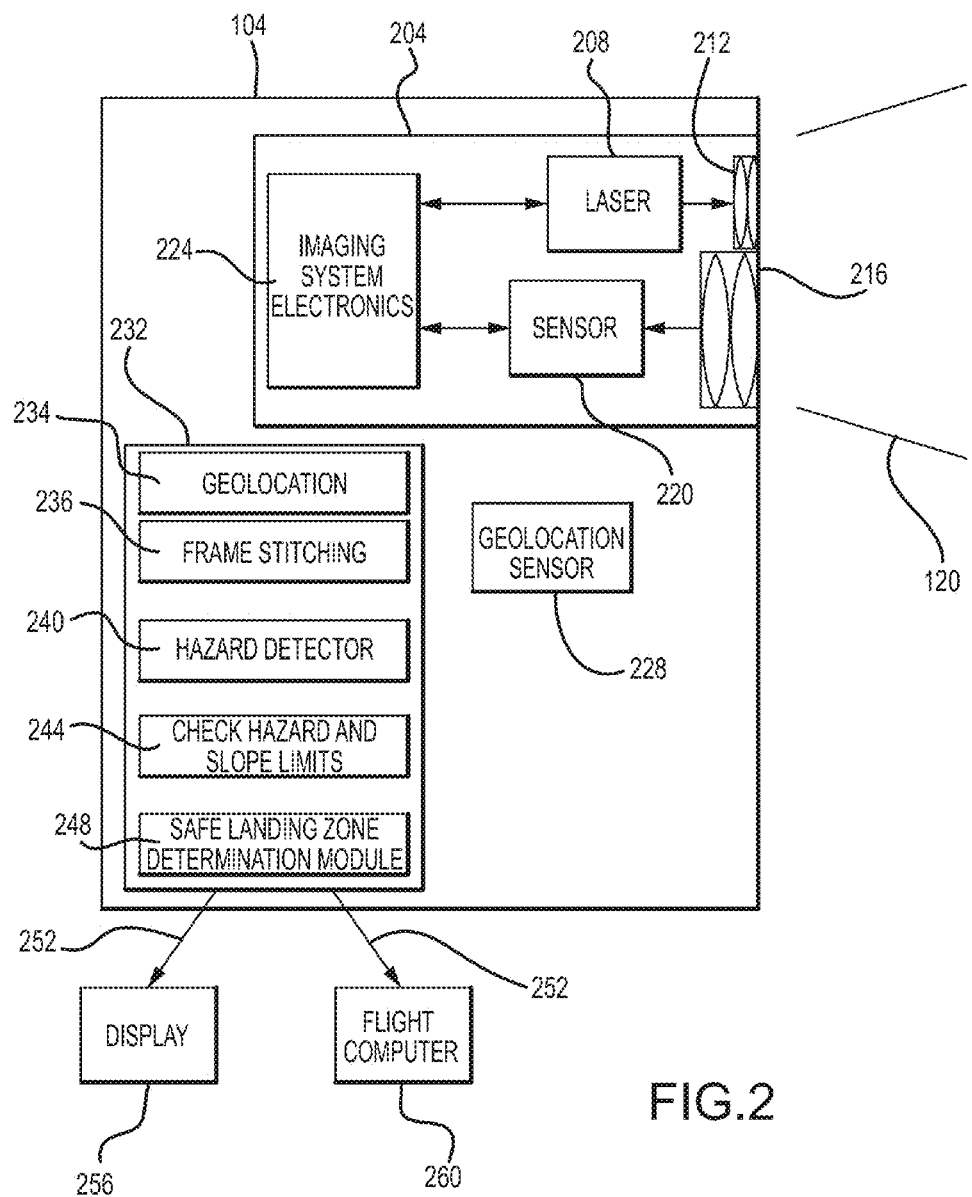
FIG. 2 depicts components of a morphology based hazard detection system in accordance with embodiments of the present disclosure.

FIG. 2 depicts components of a morphology based hazard detection system 104 in accordance with embodiments of the present disclosure. The system 104 includes a three-dimensional (3D) imaging system 204. As an example, the 3D imaging system 204 can comprise a flash LIDAR system that includes a laser light source 208 that produces an output in the form of pulsed light via transmit optics 212 within the field of view 120 of the system 104. Light reflected from an imaged surface (e.g., the surface 112 of the body 116 in FIG. 1) is collected from within the field of view 120 of the system 104 by receive optics 216. The receive optics 216 direct collected light to a sensor 220. In the example of an imaging LIDAR, the sensor 220 may comprise a focal plane array that includes a plurality of light sensitive elements, or pixels. Imaging system electronics 224 control the operation of the laser 208 and the sensor 220 to enable the collection of range information based on the time of flight of light output by the laser 208 and reflected from the area of the surface 112 being imaged that is within the field of view 120 of the sensor 220. The imaging system electronics 224 can further operate the 3D imaging system 204 to collect successive frames of three-dimensional point cloud data representative of the contour of the surface.

The hazard detection system 104 can additionally include a geolocation sensor 228. In general, the geolocation sensor 228 operates to identify a reference (e.g., reference line 140 shown in FIG. 1) with respect to which slopes 136 across portions of the imaged surface 112 are determined. In accordance with embodiments of the present invention, the geolocation sensor 228 may comprise a sensor that operates in connection with a geolocation module 234 to determine the gravity vector of the body 116 relative to the lander 108. The determined gravity vector can be used as the reference line 140 against which the slope of the surface 112 can be determined as described herein. An example of a suitable geolocation sensor 228 for determining a reference line 140 comprising or related to a gravity vector includes an accelerometer. Other geolocation sensors 228 that can be included in the hazard detection system 104 include a global positioning system receiver, inertial measurement unit, terrain relative navigation units, sun sensors, star trackers, or the like, which can be used alone or in combination to provide location information.

Point cloud data from the imaging system 204 and reference line 140 information from the geolocation sensor 228 are provided as inputs to a hazard detection processor system 232. In general, the hazard detection processor system 232 includes one or more processors and memory for implementing various processing operations or modules. These processing operations or modules (hereinafter referred to as modules), can include the geolocation module 234, a frame stitching module 236, a hazard detection module 240, a check hazard and slope limits module 244 and a safe landing zone determination module 248. Additional and/or alternative modules or logical divisions of the operation performed by the hazard detection processor system 232 are possible. For example, a data pre-processing module can be provided for filtering out outliers, determining data quality, filtering data, and/or other operations can be included. As described in greater detail elsewhere herein, the output 252 from the hazard detection processor system 232 generally includes a hazard map that provides the location of one or more areas on a surface 112 identified as being safe for landing by the lander 108. Moreover, this output 252 can be provided to a display 256, for example when the hazard detection system 104 is operated in connection with a human piloted lander 108 and/or where the operation of the lander 108 is being monitored by humans. Alternatively or in addition, the output 252 of the hazard detection system 104 can be provided to a flight computer 260, and applied by that flight computer 260 with respect to control of the lander 108 while performing a landing operation.

Figure 3:
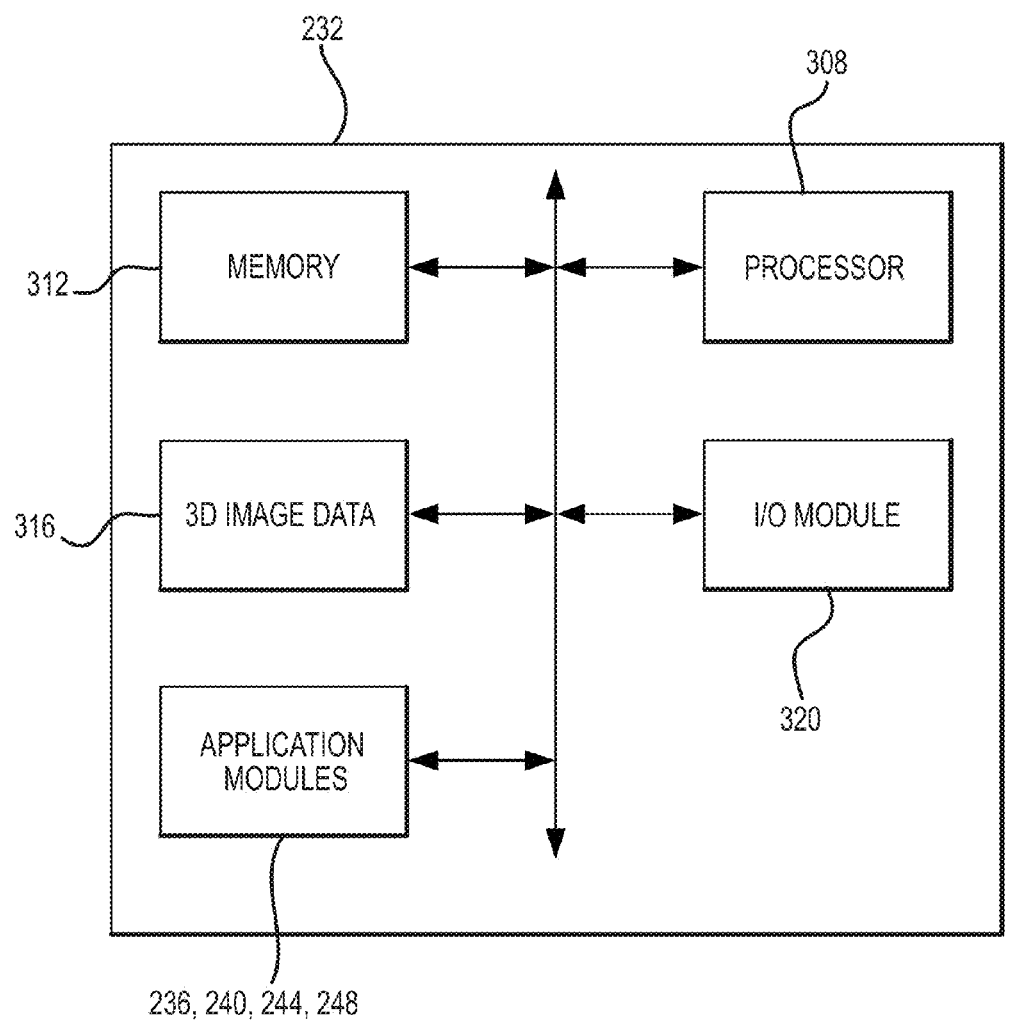
FIG. 3 depicts components of a morphology based hazard detection processor system in accordance with embodiments of the present disclosure.

FIG. 3 depicts components of a hazard detection processor system 232 in accordance with embodiments of the present disclosure. The hazard detection processor system 232 generally includes a processor 308. The processor 308 is generally capable of executing instructions or code, for example stored as software or firmware, and further operable to handle data and to identify areas determined to be safe for landing on a surface 112 as described herein. Moreover, the processor 308 can implement various processing modules or engines in connection with the identification of safe landing sites, such as frame stitching 236, hazard detection 240, check hazard and slope limits 244, and safe landing zone or site selection or determination 248 modules. As examples, the processor 308 may comprise a general purpose programmable processor, a controller, or programmable processors and/or controllers in various numbers and/or combinations.

Memory 312 may provide a store for base three-dimensional image data or point cloud data 316 comprising one or more frames or sets of images of the surface 112 provided to the hazard detection processor system 232 by the three-dimensional imaging system 204 of the hazard detection system 104. The memory 312 may also store smoothed or processed three-dimensional data 320, and hazard map data in the form of a hazard map 324 generated in accordance with the present disclosure. Pre-recorded map data 328 that can be used in connection with terrain relative navigation (TRN) can also be stored in the memory 312. In addition, the memory 312 can provide storage for the various processing systems, modules or engines 232 to 248. In accordance with embodiments of the present disclosure, the memory 312 may be implemented as solid state memory and/or other suitable data storage technologies, including but not limited to hard disk drives, optical drives, and the like. Moreover, the memory 312 may comprise different data storage technologies or devices for different types of data and/or instructions. For example, instructions executed by the processor 308 may be stored or recorded as firmware provided in memory 312 associated with the processor 308, for example where the processor 308 comprises a controller, or in memory 312 comprising read only memory or random access memory. As a further example, data 316, 320, 324 and/or 328 may be stored in one or portions of memory 312 comprising solid state memory, magnetic data storage, and/or optical data storage.

An input/output (I/O) module 320 can be provided for supporting communications, including exchanges of data, between the hazard detection processor system 232 and other components or systems, including but not limited to the three-dimensional imaging system 204, the display 256, and the flight computer 260. As examples, the input/output module 320 may comprise a connection to an external communication bus provided as part of or connected to the hazard detection system 104.

Figure 4:
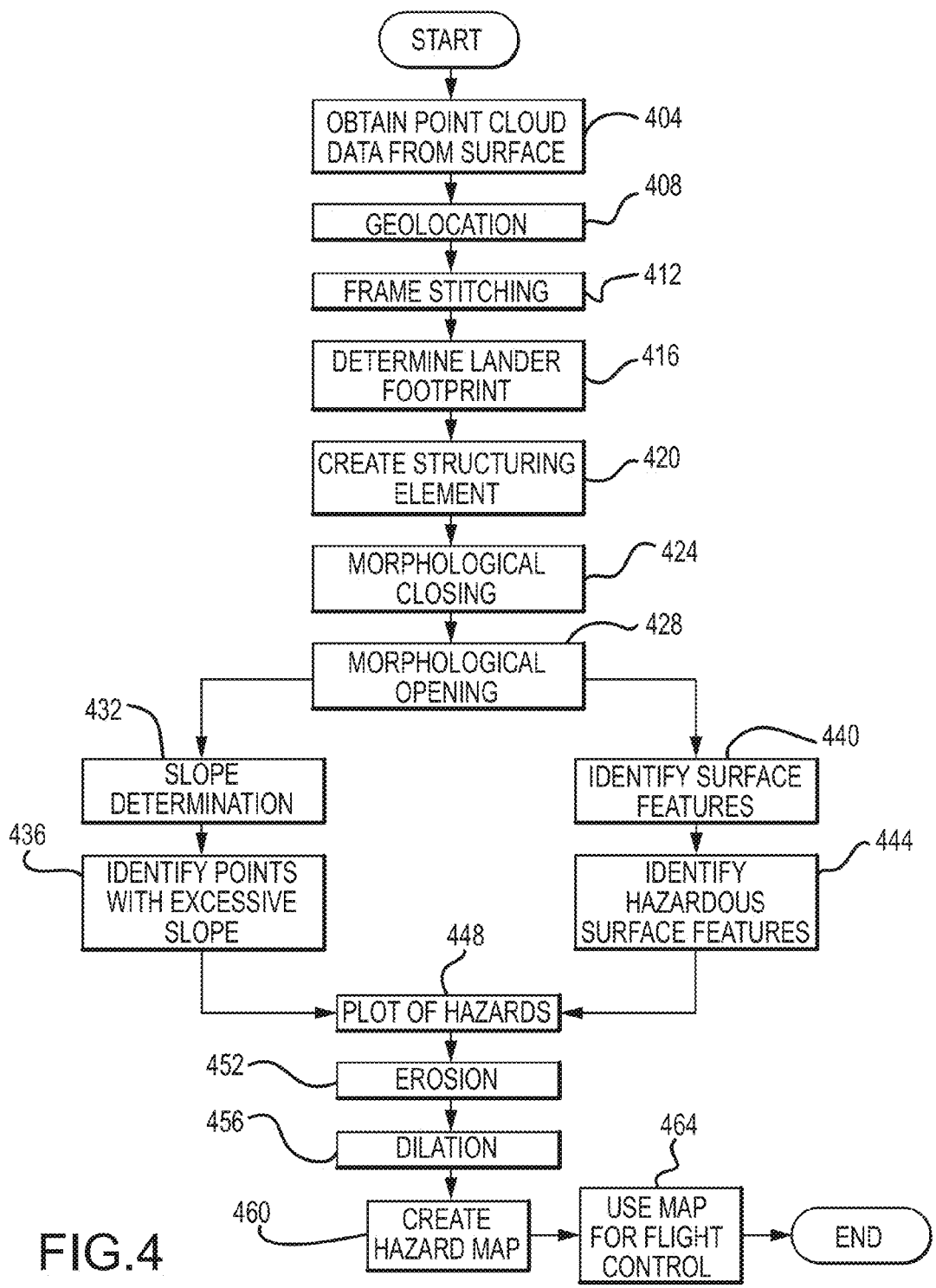
FIG. 4 is a flowchart depicting aspects of a method for morphology based hazard detection in accordance with embodiments of the present disclosure.

FIG. 4 is a flowchart depicting aspects of a method for morphology based hazard detection in accordance with embodiments of the present disclosure. The method can be applied in connection with the components of a hazard detection system 104 as described herein. More particularly, the method can be performed through operation of the hazard detection processor system 232. The method generally includes obtaining base three-dimensional image or point cloud data 316 from a surface 112 (step 404). The point cloud data 316 can comprise three-dimensional image data obtained by a 3D imaging system 204. Moreover, the three-dimensional image data 316 can be obtained by the three-dimensional imaging system 204 in real time or near real time. In accordance with other embodiments, the point cloud data may comprise three-dimensional image data 316 obtained from a surface 112 during an earlier operation, such as a survey, performed by the lander 108, or by another vehicle or system. At step 408, geolocation is performed to determine a reference line 140 with respect to the body 116 having the surface 112 on which the lander 108 is to land. Geolocation can include determining the direction of the gravity vector of the body 116. Alternatively, the reference line 140 determined by the geolocation operation can be a reference line 140 that has been defined with respect to the surface 112, for example in relation to previously identified surface 112 features. As yet another example, the geolocation operation can include determining a reference 140 that is defined by or related to a direction of travel of the lander 108 relative to the surface 112. The geolocation operation can also include obtaining geolocation data from a geolocation sensor 228, and/or the operation or execution of a geolocation module 234 provided as part of the hazard detection processor system 232.

As an optional step, frame stitching can be performed to obtain three-dimensional data 316 of the surface 112 that incorporates multiple frames of such data 316 (step 412). For example, where a safe landing site is to be selected from an area of the surface 112 that is greater than the field of view 120 of the three-dimensional imaging system 204 when the data being utilized was obtained, frame stitching can be used to create a larger contiguous or near-contiguous imaged area 124 with respect to which hazard detection operations as described herein can be performed to identify safe landing sites. The frame stitching operation can be performed through operation of the frame stitching module 236. Moreover, the frame stitching operation can include processing multiple frames of three-dimensional image data 316 stored in memory 312 by the processor 308, while the processor is executing the frame stitching algorithm 236. The results of the frame stitching process can be stored as additional three-dimensional image data 316 comprising the imaged area 124 of the surface 112. Hazard detection with respect to an imaged area 124 can be performed using individual frames of three-dimensional image data 316. Alternatively or in addition, hazard detection can be performed with respect to sets of three-dimensional image data 316 that have been stitched together by the frame stitching operation 412, to produce a set of three-dimensional image data 316 incorporating an area of the surface 112 that is larger than that encompassed by individual frames of data for a given range from the surface 112.

At step 416, the footprint of the lander 108 can be determined in points or pixels. In general, this includes applying the known lens divergence angle or field of view 120 of the three-dimensional imaging system 204 and the range of the three-dimensional imaging system 204 from the surface 112 at the time the image data was obtained, to determine the number of points or pixels in the image data 316 corresponding to the distance that is equal to the diameter of the lander 108 footprint. This operation can be performed by the hazard detection module 240 through execution of the associated programming code by the processor 308. At step 420, a structuring element comprising a mathematical model or representation of a disk or other template representing the footprint of the lander 108 is created. In accordance with embodiments of the present disclosure, the structuring element may comprise a disk with a diameter in pixels that is equal to or based on the diameter of the lander 108 in pixels. In accordance with at least some embodiments of the present disclosure, the structuring element comprises a flat, circular disk. In accordance with other embodiments, the structuring element may be in the form of a flat ellipse. In accordance with still other embodiments, different structuring element forms may be used. In general, the shape of the flat structuring element is selected so as to encompass an area with an outline that is capable of accommodating the legs or other elements of the lander 108 that will support the lander 108 on the surface 112.

At step 424, a morphological closing operation is performed. The morphological closing operation generally includes applying the structuring element to the three-dimensional image data 316 as a probe to obtain a shifted base surface. More particularly, the structuring element may comprise a template that is placed over a square array of the three-dimensional image data 316 and that is applied to that three-dimensional image data 316. The morphological closing further includes averaging points of data and subtracting the structuring element to obtain a smooth surface. Moreover, the smoothing may be performed on the scale of the lander 108 footprint. At step 428, a morphological opening is performed. The morphological opening takes the smoothed data obtained from the morphological closing operation, and includes adding the template expressing the structuring element to the data smoothed during the morphological closing to obtain normalized and smoothed data 320. The morphological closing and opening operations therefore have the effect of smoothing the three-dimensional image data 316 obtained from the surface on the scale of the lander. In accordance with embodiments of the present disclosure, both the morphological closing and morphological opening operations are performed. In particular, if the morphological closing operation (or alternatively the morphological opening operation) were performed in isolation, the resulting smoothed data would be shifted in elevation. The shift in elevation that results from applying only a morphological opening or only a morphological closing operation can be corrected or addressed by shifting the smoothed surface by the difference in the mean surface elevation before and after the morphological operation. However, the resulting data can be skewed by the presence of large bumps or holes, and therefore is not as reliable as techniques that apply both a morphological closing and a morphological opening. In addition, embodiments of the present disclosure perform the morphological closing prior to the morphological opening. Alternatively, the morphological opening can be performed prior to the morphological closing, but results in a slight upward bias to the data, making bump determination less conservative.

After performing the morphological operations, the resulting smoothed data 320 can be used to determine the slope of the surface and to identify bumps or holes in the surface, in separate operations. These separate operations may be performed in parallel. With respect to determining the slope of the surface 112, the number of pixels over which the finite differences for slope determination is calculated (step 432). This can be set to the ceiling of the lander footprint radius divided by the pixel dimension. Slope determination can include taking the central finite differences along each grid direction on the smoothed surface. More particularly, the angles can be calculated from the finite differences in each direction as the sqrt(i_slopes^2+j_slopes^2). The square root operator can be avoided by simply comparing the square to the slope threshold or value derived from the slope threshold. The angles from the calculated finite differences, and those points at which the slope exceeds a predetermined threshold can then be identified, for example by or with reference to the check hazard and slope limits module 244 (step 436).

In accordance with at least some embodiments of the present invention, the method for calculating local slopes within the three-dimensional image data 316 applies a filter to the smoothed three-dimensional data 320. More particularly, the filter based method uses an approximation to the derivative of a truncated Gaussian function (−1 to 1) that extends to the peaks. This allows use of a filter to compute the slopes, reducing the computation time as compared to various alternative methods. More particularly, the approximation to the Gaussian first derivative is calculated, and the filter is applied in each grid direction to compute the slopes in each direction. By using an approximation to the first derivative of the Gaussian function, integer math can be used in the filter kernel generation. The results of using integer math were found to be nearly identical to using the derivative of a Gaussian function, and can be computed much more quickly than using the derivative. The Gaussian kernel can be truncated at the peak, to ensure that the slopes are weighted towards the points near the perimeter of the lander 108 footprint, where the vehicle legs would actually rest on the surface. The kernel is a square matrix with an odd number of entries on each side. As an example, and without limitation, an 11 by 11 differentiation kernel can be applied, for example as illustrated in FIG. 5. Normalization of the kernel can be performed by dividing the resulting slope by the sum of the matrix components shown in FIG. 5 above the row of zeros. This enables direct calculation of the slope, rather than a relative metric. A normalization factor can then be applied. In accordance with embodiments of the present invention, the normalization factor can be applied by tuning the kernel size for a plane at a selected angle to horizontal. More particularly, the angle of the plane with respect to horizontal, as determined with reference to the reference vector 140, can equal the threshold slope value used to identify areas having excessive slope. In accordance with alternate embodiments, the slope determination is performed to the unsmoothed 3D image data 316, or to the smoothed image data 320, in operations performed separately from the bump and hole calculations. This in turn allows slope determination functions to be performed on different time scales from bump and hole determination functions. For example, slope calculation operations could be performed less frequently than bump and hole identification operations.

At step 440, the smoothed data 320 obtained through the image morphology operations is used to identify surface features, such as bumps and holes. In accordance with embodiments of the present disclosure, the smoothed data used to identify the surface features is the same smoothed data 320 used to identify slope hazards at steps 432 to 436. The operation performed to identify the surface features can include subtracting the smoothed data 320 obtained through the image morphology operations from the original or base three-dimensional surface data 316. As a result of such an operation, surface features presenting bump hazards are represented by positive numbers, while features presenting holes are represented as negative numbers. At step 444, surface features that present a hazard to the lander 108 are identified. This can include marking areas of the smoothed three-dimensional surface data in which hazards in the form of bumps or holes having a vertical component with an absolute value in excess of a selected bump threshold value are located.

The results of the slope determination operations (steps 432 and 436) and the surface feature identification operations (steps 440 and 444) can be combined to create a plot of identified hazards (step 448). In accordance with embodiments of the present disclosure, the plot of identified hazards can comprise the smoothed data 320, with areas including hazardous slopes or surface features marked or otherwise identified. Good landing sites are the areas of the smoothed three-dimensional surface data that do not include slopes, bumps or holes in excess of acceptable amounts. For example, acceptable landing sites can comprise the areas of the imaged surface 124 that lie between areas identified as having a slope in excess of the selected threshold amount, bumps that are less than a selected positive threshold amount, or holes that are less than a selected negative threshold amount.

At step 452, the areas comprising good landing sites are eroded. Eroding the acceptable landing sites can be performed using a disk structuring element with a radius that is the same or different than the lander 108 footprint radius. For example, a proportionality value, where the proportionality value is less than one, can be applied to the lander 108 radius. As a particular example, the proportionality value may be 0.7, though other values may be used, depending on the margin of error desired. As another example, a proportionality value of greater than one can be applied. The erosion operation tends to eliminate small (i.e., smaller than the lander footprint) regions of good landing sites. As a result, the smoothed three-dimensional image data 320 is cleaned considerably. This is advantageous, because the acceptability of a landing site is, in accordance with embodiments of the present disclosure, being evaluated at every grid point (i.e., every pixel), which is a scale much smaller than the lander 108 footprint.

At step 456, the good landing sites remaining after the erosion operation are dilated. Dilation, which is the dual of erosion, has the effect of smoothing the edges of the good landing site areas. Like the erosion operation, the dilation operation can have the effect of cleaning the smoothed three-dimensional data 320. The erosion operation can apply a disk structuring element having a radius that is of the same or different than the radius of the lander 108 footprint. For instance, the same proportionality value applied in the erosion operation can be applied to the radius of the lander 108 footprint to obtain the diameter of a disk shaped structuring element used in the dilation operation. In accordance with at least some embodiments, the applied proportionality value is less than one. In accordance with other embodiments, the proportionality value is greater than one. Following application of the erosion and dilation operations, a three-dimensional hazard map 324 can be created (step 460).

The hazard map 324 marks areas having slopes in excess of a threshold amount, and/or surface features, such as bumps or holes, in excess of threshold amounts, as hazardous areas. Areas between hazardous areas that are large enough to accommodate the footprint of the lander 108 are identified as safe landing areas. In accordance with at least some embodiments of the present invention, the areas identified as safe for landing can be identified with some margin for error or safety, to accommodate potential errors or in precision in flight control, or other variables. At step 464, the hazard detection map 324 can be applied in connection with flight control operations. More particularly, one or more potential landing sites can be selected from the hazard detection map 324, and targeted as an actual landing site for use in landing the vehicle 108 on the surface 112 of the body 116. The actual landing site selected can be a preferred landing site, such as the landing site within a particular area of the surface 112 that has the most margins, the least surface texture, or the largest acceptable landing area.

In accordance with embodiments of the present disclosure, the process of obtaining three-dimensional or point cloud data 316 from a surface 112, and processing that data to identify hazards can continue, so long as hazard information 316 remains to be processed and/or continues to be obtained. For example, hazard detection as described herein can be performed as each new frame of three-dimensional image data 316 is obtained. As a further example, hazard detection can be performed after a set number of data frames have been obtained. As yet another example, hazard detection can be performed at a first, relatively low rate, for example to maintain an awareness of potential landing sites, if required, while the lander 108 travels above the surface 112, and at a second, higher rate, when the lander 108 is approaching a landing site.

In accordance with further embodiments of the present disclosure, the hazard map 324 is not required to contain true three-dimensional data. For example, the hazard map can comprise what is sometimes referred to as 2½ dimensional data, in which pixels or other units of a two-dimensional image or representation of a surface are marked or otherwise associated with information indicative of vertical features such as slopes, bumps, or holes, but are not necessarily associated with coordinates in three dimensions. Accordingly, a hazard map 524 is not required to contain detailed or true three-dimensional information.

Figure 6A:
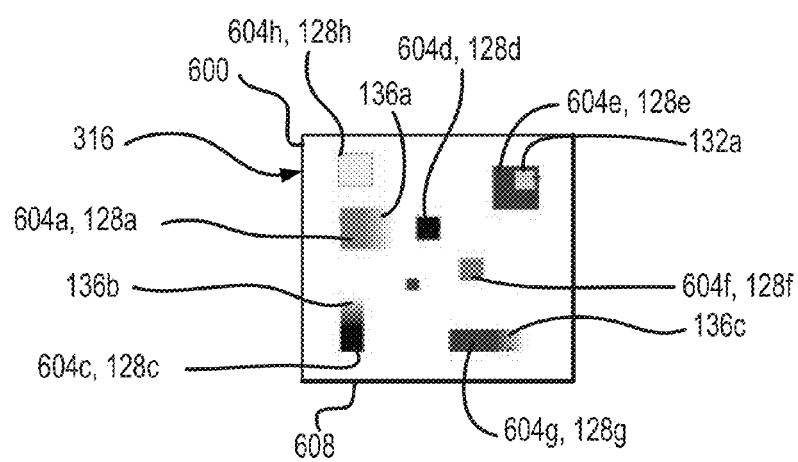
FIG. 6A depicts exemplary three-dimensional image data obtained from a surface in accordance with embodiments of the present disclosure.

FIG. 6A is an exemplary image frame 600 that depicts three-dimensional image data 316 obtained from within an imaged area 124 of a surface 112 by the three-dimensional imaging system 204 of a hazard detection system 104 in accordance with embodiments of the present disclosure. More particularly, the example three-dimensional image data 316 comprises a 256×256 pixel image frame 600. Within the image frame 600 are a number of blocks 604 representing surface features. These include: a first block 604a with a first bump or projection 128a having a height from the base surface, represented by surface 608, of 20 cm and a 8° sloped surface or edge 136a; a 30 cm high block or projection 604b, 128b; a 40 cm high block or projection 604c, 128c, with a 14° sloped edge 136b; a 40 cm block or projection 604d, 128d; a 30 cm block or projection 604e, 128e, with a 20 cm depression 132a within the perimeter of the projection 128e; a 20 cm block or projection 604f, 128f; a 30 cm high block 604g, 128g, with a 12° sloped edge 136c; and a 10 cm high block 604h, 128h. As can be appreciated by one of skill in the art after consideration of the present disclosure, the three-dimensional image data 316 used to produce the image frame 600 comprises three-dimensional point cloud data, with an X, Y and Z component for each of the pixels represented by the image 600. Moreover, the image 600 is presented as a gray-scale image, with the different distances from the base surface 608 represented by the shade of gray of the pixels.

Figure 6B:
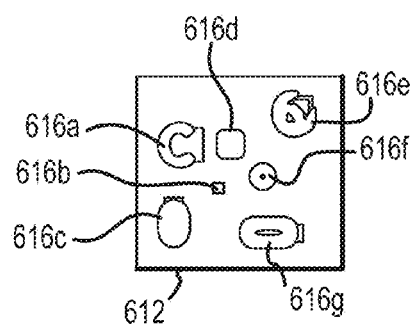
FIG. 6B depicts an exemplary plot of identified hazards.

FIG. 6B is an exemplary plot of identified hazards 612 derived from the example three-dimensional image data 316 depicted in FIG. 6A. More particularly, an image or plot of identified hazards 612, identified from smoothed data 320 created from the exemplary three-dimensional image data 316 of the image frame 600 is depicted. In this example, hazardous areas include those portions of the imaged area 124 that include a slope in excess of a threshold angle (here 10° from a plane normal to the reference line 140) or a surface feature in the form of a projection or a depression that deviates from the base surface 608 by more than a threshold amount (here 30 cm). Specifically, hazardous area 616a corresponds to block 604a; hazardous area 616b corresponds to block 604b; hazardous area 616c corresponds to block 604c; hazardous area 616d corresponds to block 604d; hazardous area 616e corresponds to block 604e; hazardous area 616f corresponds to block 604f; and hazardous area 616g corresponds to block 604g. As can be seen from the figures, the hazardous areas 616 identified from the smooth data 320 have different shapes than the features 128, 132, and 136 in the original three-dimensional data 316. This is a result of the smoothing performed by the morphology operations. In addition, certain of the surface features are represented as hazards, even though the features do not exceed the surface feature threshold. For example, in the case of the 20 cm block 604f, which has an absolute value that deviates from the base surface by less than the threshold amount of 30 cm in this example, is shown as creating a hazardous area. However, the hazard detection processes disclosed herein have, in this example, identified a slope hazard as a result of that surface feature 604f. More particularly, there is a correlation between the diameter of the lander 108 footprint used in identifying safe landing areas and the slope and bump hazard thresholds. Specifically, a relatively small lander 108 footprint diameter can result in the identification of a slope hazard where a relatively larger diameter lander 108 footprint will not. Embodiments of the present invention can also result in relatively small bump hazards being filtered from slope hazard detection results, but not bump detection results. An example is the 30 cm block 604b, which is represented as a bump hazard, but not a slope hazard, in the plot of identified hazards 612 (i.e., it is shown as a single solid line over an area corresponding to the perimeter of the associated bump 128b, rather than as a blurred area extending past the perimeter of the bump 128b). In addition, bump 128h is not represented as a hazard in the plot of identified hazards 612. This is because, in this example, its height of 10 cm is not in excess of the bump threshold, and because the height of the bump 128h relative to the diameter of the lander 108 footprint for this example does not present a slope hazard.

Figure 6C:
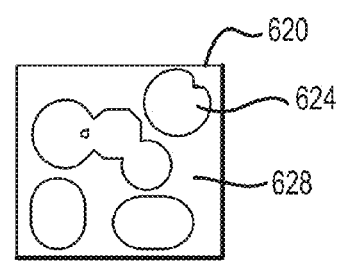
FIG. 6C depicts an exemplary hazard map.

FIG. 6C is an image 620 depicting an exemplary hazard map 324. In this example, the darker areas 624 represent areas that are not safe for landing, while the lighter areas 628 are areas identified as being safe for landing. The hazard map 324 image 620 is the result of performing erosion and dilation operations with respect to the plot of identified hazards 612. The erosion and dilation operations remove the smaller safe landing areas, creating a margin of safety, for example to account for navigational and control error, in areas surrounding identified hazards 616. In addition, it can be seen that an area corresponding to the identified hazard 616b is included in a safe landing area in the hazard map image 620. In particular, the small diameter of the associated surface feature 128b has resulted in that feature being filtered out from the hazard map data 620. This result is unlikely to be of concern with respect to the detection of natural surface features 128 in landing scenario. In other scenarios, for example where detection of man made objects is a concern, measures can be taken to retain the identification of such features and to include representation of them in the associated hazard map 324.

Although various examples of systems and included components and modules have been described herein, various alternate configurations can be employed in connection with embodiments of the present invention. For example, a hazard detection processor system 232 is not required to be divided into different modules, either physically or logically. In accordance with other embodiments, different divisions of hazard detection processor system 232 operations can be utilized. In addition, although steps of methods and processes for hazard detection have been described in a particular order, different sequences or arrangements of process or method steps are possible.

Embodiments of the present disclosure can be applied in connection with automated landing procedures. Still other embodiments have application in connection with remotely piloted vehicles. Still other embodiments can be used to provide assistance to human piloted vehicles.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method for detecting features of a surface, comprising:
receiving three-dimensional data related to the surface;
performing an image morphology operation on the received three-dimensional data to obtain base surface data;
determining from the base surface data a slope of the surface relative to a reference line; and
determining from the base surface data a location of at least a first surface feature, wherein determining a location of at least a first surface feature includes:
subtracting the three-dimensional data from the base surface data to obtain surface feature data;
identifying points in the surface feature data that exceed a bump threshold.

2. A method for detecting features of a surface, comprising:
receiving three-dimensional data related to the surface;
performing an image morphology operation on the received three-dimensional data to obtain base surface data, wherein the image morphology operation includes:
smoothing the three-dimensional data using a structuring element, wherein the structuring element has a size corresponding to a footprint of a lander; and
determining from the base surface data a slope of the surface relative to a reference line.

3. The method of claim 2, wherein the structuring element is a disk.

4. The method of claim 3, wherein the image morphology operation includes:
a morphological closing; and
a morphological opening.

5. A method for detecting features of a surface, comprising:
receiving three-dimensional data related to the surface;

performing an image morphology operation on the received three-dimensional data to obtain base surface data; and calculating from the base surface data a slope of the surface relative to a reference line, wherein the calculation of a slope includes:

calculating a difference in altitude between two points, wherein the distance between the two points is equal to the diameter of a footprint of a lander.

6. The method of claim 5, wherein the image morphology operation includes:

a morphological closing; and a morphological opening.

7. A method for detecting features of a surface, comprising:

receiving three-dimensional data related to the surface;

performing an image morphology operation on the received three-dimensional data to obtain base surface data; and calculating from the base surface data a slope of the surface relative to a reference line, wherein the calculation of the slope includes:

calculating a number of points in the base surface data over which to take finite differences for slope determination;

from the base surface data, taking a central finite difference along each direction;

calculating angles from the finite differences in each direction.

8. The method of claim 7, wherein the number of points over which the finite differences for slope determination is taken is equal to the number of points in the base surface data included in a distance across the surface that is equal to the diameter of a lander footprint.

9. The method of claim 8, further comprising:

determining from the base surface a location of at least a first feature on the surface;

subtracting the three-dimensional data from the base surface data to obtain surface feature data;

identifying points in the surface feature data that exceed a bump threshold;

identifying at least a first good landing site, wherein each good landing site includes:

an area equal to or greater than the lander footprint that includes surface feature data that does not exceed a bump threshold and that has a slope that does not exceed a slope threshold.

10. The method of claim 9, further comprising:

eroding each good landing site by applying a first proportionality value, wherein the first proportionality value is less than one.

11. The method of claim 10, further comprising:

dilating each good landing site by applying a second proportionality value, wherein the second proportionality value is less than one multiplied by a radius of the lander footprint.

12. The method of claim 9, further comprising:

providing a steering control signal to the lander, wherein the lander is guided to the first good landing site.

13. A method for detecting features of a surface, comprising:

receiving three-dimensional data related to the surface;

performing an image morphology operation on the received three-dimensional data to obtain base surface data; and determining from the base surface data a slope of the surface relative to a reference line, wherein the reference line is a gravity vector of a body associated with the surface.

14. A system for detecting features of a surface, comprising:

a hazard detection processor system, wherein an image morphology operation is performed on three-dimensional surface data to obtain base surface data, wherein a slope of the surface relative to a reference line is determined from the base surface data, and wherein a hazard map indicating safe landing areas on the surface is output by the hazard detection processor system.

15. The system of claim 14, further comprising:

at least one of a flight computer and a display, wherein the hazard map is provided to the at least one of the flight computer and the display.

16. The system of claim 14, further comprising:

a three-dimensional imaging system, wherein the three-dimensional surface data is provided to the hazard detection processor system by the three-dimensional imaging system.

* * * * *